(12) United States Patent
Galbraith et al.

(10) Patent No.: US 7,974,037 B2
(45) Date of Patent: Jul. 5, 2011

(54) TECHNIQUES FOR PROVIDING DC-FREE DETECTION OF DC EQUALIZATION TARGET

(75) Inventors: Richard Leo Galbraith, Rochester, MN (US); Travis Roger Oenning, Rochester, MN (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 661 days.

(21) Appl. No.: 12/035,338

(22) Filed: Feb. 21, 2008

(65) Prior Publication Data

US 2009/0213484 A1 Aug. 27, 2009

(51) Int. Cl.
*G11B 5/035* (2006.01)
(52) U.S. Cl. .............. 360/65; 360/31; 360/62
(58) Field of Classification Search ............ None
See application file for complete search history.

(56) References Cited

U.S. PATENT DOCUMENTS

| | | | | |
|---|---|---|---|---|
| 5,355,356 A * | 10/1994 | Johann et al. | ......... | 369/59.15 |
| 5,550,683 A * | 8/1996 | Koren | ......... | 360/46 |
| 6,661,590 B2 | 12/2003 | Cyrusian et al. | | |
| 6,697,204 B2 | 2/2004 | Cyrusian | | |
| 6,995,932 B1 * | 2/2006 | He | ......... | 360/25 |
| 7,142,380 B2 * | 11/2006 | Ueno | ......... | 360/46 |
| 7,164,371 B2 | 1/2007 | Lee et al. | | |
| 7,205,912 B1 | 4/2007 | Yang et al. | | |
| 7,259,929 B2 * | 8/2007 | Sawaguchi et al. | ......... | 360/65 |
| 7,286,311 B1 * | 10/2007 | Oberg et al. | ......... | 360/25 |
| 7,440,208 B1 * | 10/2008 | McEwen et al. | ......... | 360/39 |
| 7,446,685 B1 * | 11/2008 | Kikugawa et al. | ......... | 341/142 |
| 7,489,750 B1 * | 2/2009 | Oberg | ......... | 375/350 |
| 7,602,567 B2 * | 10/2009 | Park et al. | ......... | 360/39 |
| 2007/0146917 A1 | 6/2007 | Song et al. | | |

OTHER PUBLICATIONS

Srinivasan Gopalaswamy and Peter McEwen, "Read Channel Issues in Perpendicular Magnetic Recording," IEEE Transactions on Magnetics, vol. 37, No. 4, Jul. 2001, pp. 1929-1931.

Weijun Tan, and J. R. Cruz, "Detection of Media Defects in Perpendicular Magnetic Recording Channels," IEEE Transactions on Magnetics, vol. 41, No. 10, Oct. 2005, pp. 2956-2958.

* cited by examiner

*Primary Examiner* — Dismery E Mercedes
(74) *Attorney, Agent, or Firm* — Steven J. Cahill (57) ABSTRACT

A data storage device includes a first filter that generates a short DC equalization target in response to a read back signal generated from magnetic patterns that are recorded on a storage medium using perpendicular recording. The data storage device also includes a first detector that generates an output sequence in response to the short DC equalization target. The data storage device also includes a high pass filter that attenuates DC components of the short DC equalization target and that passes low frequency components of the short DC equalization target above a cutoff frequency to generate a filtered signal. The data storage device also includes a second detector that processes the output sequence in response to the filtered signal.

20 Claims, 6 Drawing Sheets

TECHNIQUES FOR PROVIDING DC-FREE DETECTION OF DC EQUALIZATION TARGET

BACKGROUND OF THE INVENTION

The present invention relates to techniques for detecting bits in systems, such as hard disk drives, and more particularly, to techniques for DC-free detection of a DC equalization target.

Data storage devices are systems that store bits representing data. Data storage devices include hard disk drives, optical disk drives, and other systems.

BRIEF SUMMARY OF THE INVENTION

A data storage device includes a first filter that generates a short DC equalization target in response to a read back signal generated from magnetic patterns that are recorded on a storage medium using perpendicular recording. The data storage device also includes a first detector that generates an output sequence in response to the short DC equalization target. The data storage device also includes a high pass filter that attenuates DC components of the short DC equalization target and that passes low frequency components of the short DC equalization target above a cutoff frequency to generate a filtered signal. The data storage device also includes a second detector that processes the output sequence in response to the filtered signal.

Various objects, features, and advantages of the present invention will become apparent upon consideration of the following detailed description and the accompanying drawings.

DETAILED DESCRIPTION OF THE INVENTION

Hard disk drives are data storage devices that store data as magnetic patterns on magnetic hard disks. Although many embodiments of the present invention are described in the context of hard disk drives, it should be understood that embodiments of the present invention can be used in other types of data storage devices. A hard disk drive includes a write element that writes the magnetic patterns on the hard disk and a read sensor that generates a read back signal in response to reading the magnetic patterns on the hard disk. The write element and the read sensor are typically part of a read/write head.

Some types of hard disk drives use a recording technique referred to as perpendicular recording. In a hard disk drive that uses perpendicular recording, the read sensor generates a read back signal that contains a substantial amount of energy in low frequency signals that are close to DC (direct current). For example, the read sensor may generate a substantial amount of energy in signals that are 1% of the bit rate.

According to some embodiments of the present invention, a data storage device uses a short DC equalization target to optimize the detection of low frequency components of read back signals. A read sensor reads magnetic patterns that are recorded on a magnetic medium using perpendicular recording to generate the read back signals. The data storage device can include a digital finite impulse response (DFIR) filter that generates a short equalization target signal from the read back signal (e.g., a 1-2-1 short equalization target). The short DC equalization target can, for example, refer to a detector that takes into account inter-symbol interference (ISI).

When using perpendicular recording with a PRML (Partial Response Maximum Likelihood) style channel, a short equalization target that includes a DC response represents an overall very good match to the system. However, the channel signal path does not actually pass DC energy. A very low pole associated with the head-media, a preamplifier pole, and a channel front-end pole all block DC energy.

As a result, detectors that are designed to detect information from the read sensor at DC usually propagate errors. According to some embodiments of the present invention, a data storage device uses a short DC equalization target with DC-free detection to minimize the propagation of errors. The data storage device generates a target that is spectrally very well matched to a perpendicular magnetic recording system. The data storage device provides DC-free detection without degradation caused by DC circuit offsets, because the data storage device is not sensitive to DC levels generated by the read sensor.

The DC-free virtual short target combines very well with a low density parity check (LDPC) code. The data storage device eliminates the need for a DC restore circuit in the detection process.

The data storage device can provide DC-free detection by using a high pass filter that has a new digitally implemented dominant low frequency pole for filtering the short DC equalization target. The dominant pole occurs at a low frequency near DC. The dominant pole allows the high pass filter to attenuate signals below the cutoff frequency of the dominant pole. The dominant pole eliminates the significance of the pre-amplifier pole and the front-end pole in the data storage device, because the dominant pole occurs at a greater frequency than the other AC poles. The dominant pole causes the filter to reject the lowest 1% of the channel bandwidth where 1/frequency noise issues often dominate the signal response.

Figure 1:
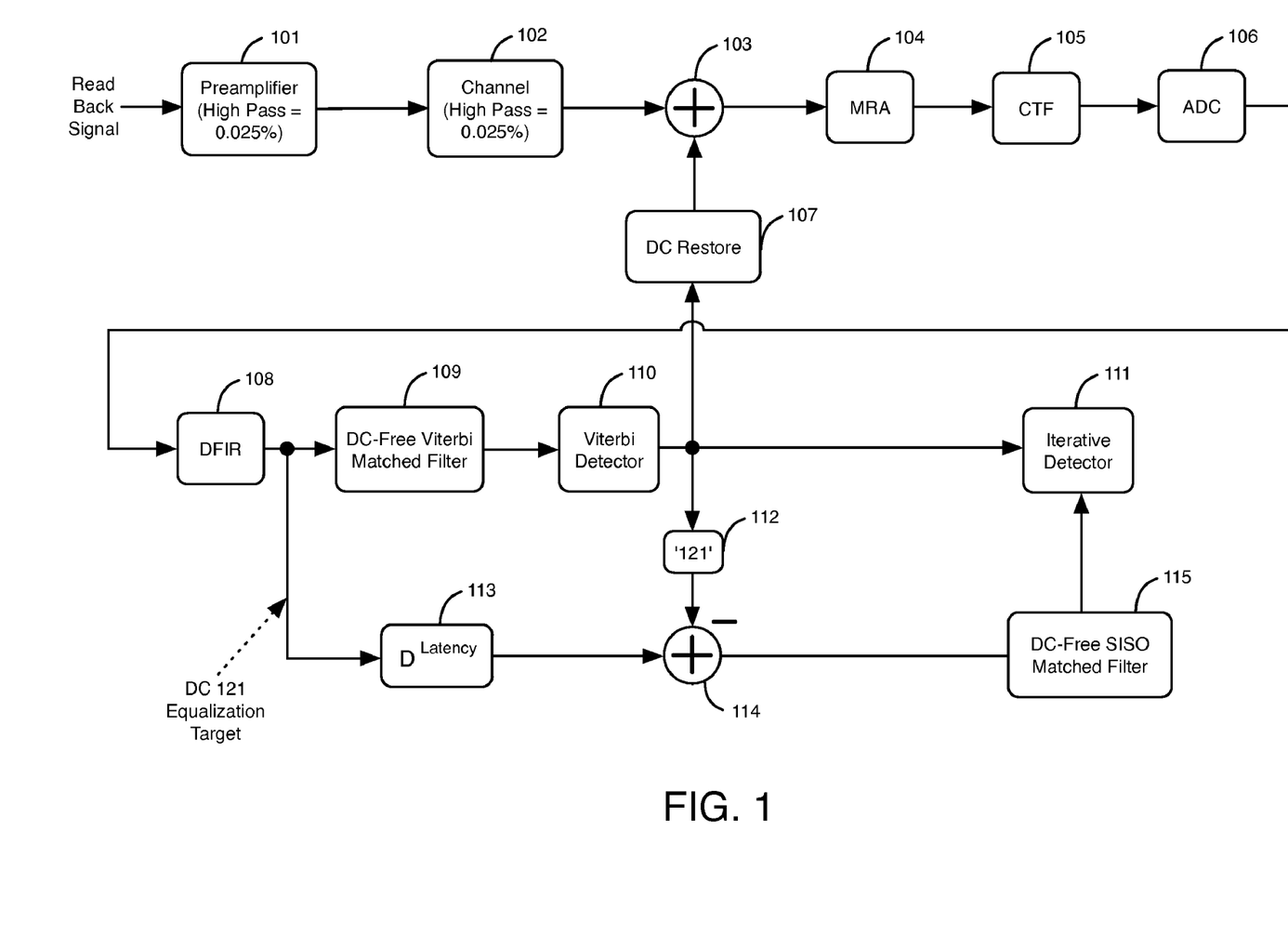
FIG. 1 is a block diagram that shows various components in a hard disk drive that process a read back signal from a magnetic disk, according to an embodiment of the present invention.

FIG. 1 is a block diagram showing various components in a hard disk drive that process a read back signal from a magnetic disk, according to an embodiment of the present invention. The components shown in FIG. 1 include a high pass coupling pole (e.g., 0.025%) included as part of preamplifier 101, a high pass coupling pole (e.g., 0.025%) included as part of channel input 102, an adder 103, magneto resistive head asymmetry correction circuit (MRA) 104, continuous time filter (CTF) 105 (i.e., anti-aliasing low-pass filter), analog-to-digital converter (ADC) 106 having a 6-bit output, DC restore circuit 107, digital finite impulse response (DFIR) filter 108, DC-free Viterbi matched filter 109, Viterbi detector 110, iterative detector 111, '121' finite impulse response (FIR) filter 112, delay block 113, adder 114, and DC-free soft-input-soft-output (SISO) matched filter 115.

The read signal at the output of ADC 106 has ISI, but the ISI of the read signal is not mathematically well defined. DFIR filter 108 equalizes the output signal of the ADC 106 to a DC '121' short equalization target. DFIR filter 108 is a 16-tap FIR filter. The 16 coefficients are adaptively arrived at using a special hardware circuit. DFIR filter 108 is adaptively adjusted in response to customer data such that the equalized response due to an isolated magnet is '121'. The goal of DFIR filter 108 is to equalize the sampled signal to a mathematically crisp ISI definition of '121'. The transfer function of the system (from the read/write head to the DFIR filter 108 output) is effectively '121'.

DC-free Viterbi matched filter block 109 filters the DC short equalization target output of DFIR filter 108 to generate a DC-free matched signal at the input of Viterbi detector 110. Viterbi detector 110 generates a most likely sequence of states for the read back signal.

The output sequence of Viterbi detector 110 is processed by DC restore circuit 107 and added to the output of channel 102 at adder 103. The output sequence of Viterbi detector 110 is also processed by iterative detector 111 and '121' FIR filter 112. FIR filter 112 is a 3-tap FIR with coefficients '121'.

The output signal of DFIR filter 108 is delayed by delay block 113 by a delay $D^{LATENCY}$. The delayed output signal of delay block 113 is subtracted from the output signal of '121' filter 112 using adder 114 to generate an error signal that is transmitted to DC-free SISO matched filter 115. DC-free SISO matched filter 115 filters the error signal from adder 114 to generate a filtered output signal that is transmitted to iterative detector 111. DC-free SISO matched filter 115 contains a high pass filter having a digitally implemented dominant low frequency pole that attenuates very low frequency signals near DC, as described above. Iterative detector 111 decodes the output sequence of Viterbi detector 110 using the filtered output signal of DC-free SISO matched filter 115.

Figure 2A:
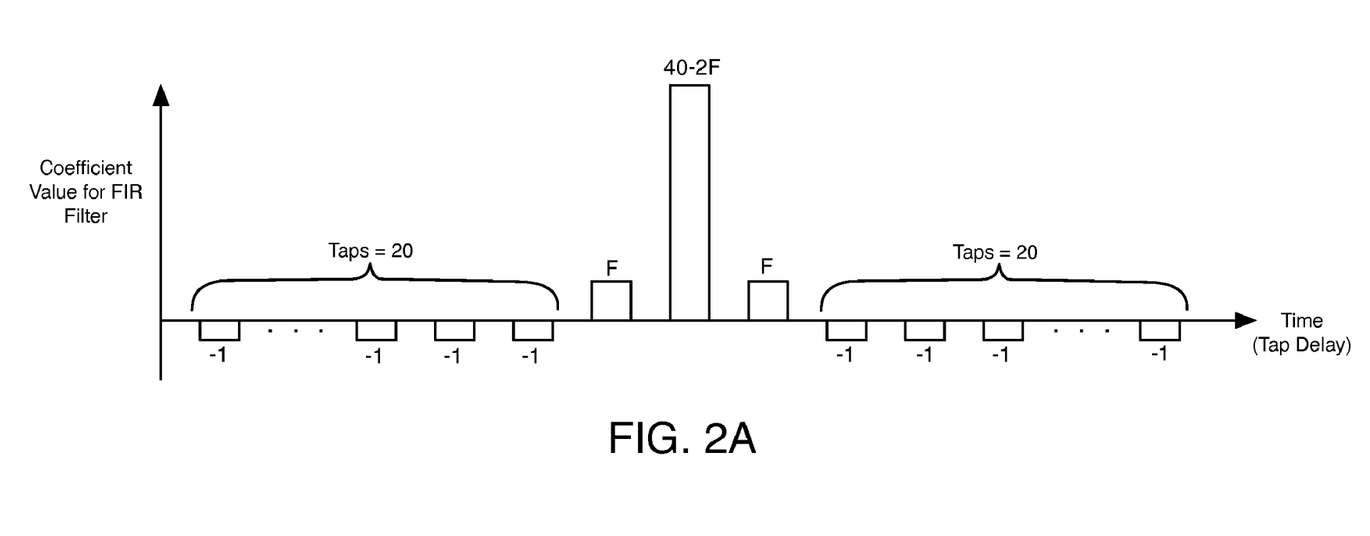
FIG. 2A is a graph that illustrates coefficients that a digital finite impulse response (DFIR) filter in a DC-free soft-input-soft-output (SISO) matched filter multiplies by an input signal during different tap delays to generate DC-free detection in a hard disk drive using perpendicular recording, according to an embodiment of the present invention.
Figure 2B:
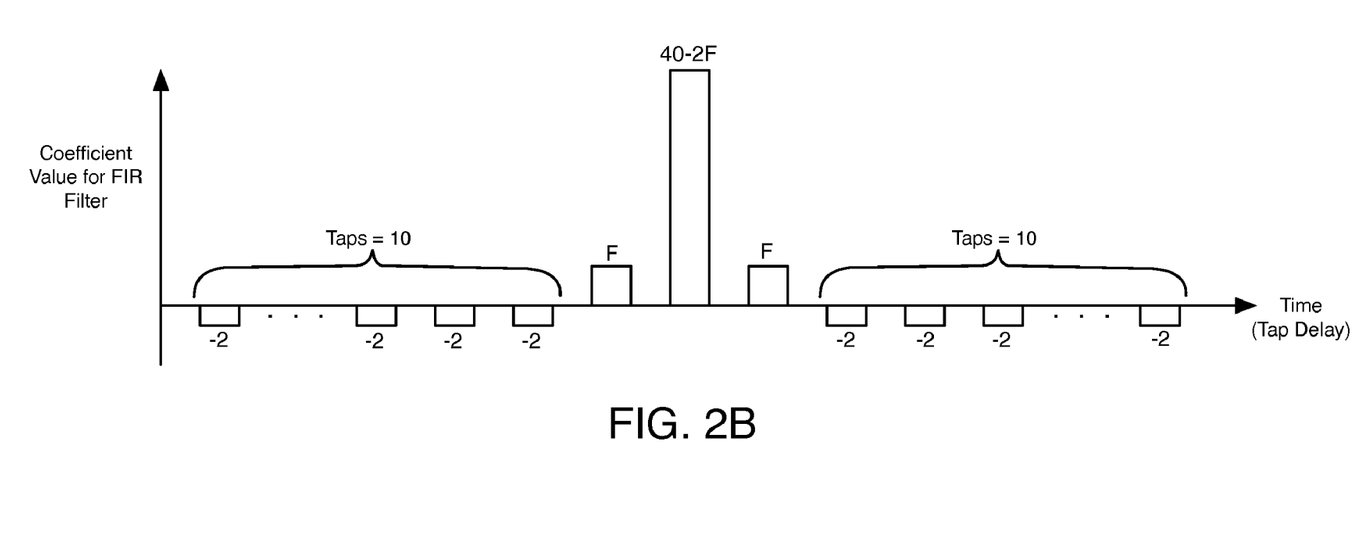
FIG. 2B is a graph that illustrates another set of coefficients that a digital finite impulse response (DFIR) filter in a DC-free soft-input-soft-output (SISO) matched filter multiplies by an input signal during different tap delays to generate DC-free detection in a hard disk drive using perpendicular recording, according to an embodiment of the present invention.

In some embodiments, DC-free SISO matched filter 115 includes a digital finite impulse response (DFIR) filter that introduces the dominant pole into the filtering of the signals detected by the read sensor. The DFIR filter in filter 115 is implemented using digital logic circuits. FIGS. 2A-2B are graphs that illustrate coefficients that the digital finite impulse response (DFIR) filter in DC-free soft-input-soft-output (SISO) matched filter 115 multiplies by an input signal during different tap delays to generate DC-free detection in a hard disk drive using perpendicular recording, according to embodiments of the present invention. The DFIR filter in matched filter 115 includes the coefficients that are represented by the positive and negative bars shown in FIG. 2A. Alternatively, the DFIR filter in matched filter 115 can include the coefficients that are represented by the positive and negative bars shown in FIG. 2B. The DFIR filter in matched filter 115 multiples the coefficients shown in FIG. 2A or in FIG. 2B to the input error signal from adder 114 during different tap delays of the input error signal.

The DC response of filter 115 is the sum of all of the coefficients shown in FIG. 2A or all of the coefficients shown in FIG. 2B. The DFIR filter in matched filter 115 applies the coefficients to the input error signal from adder 114 during different tap delays to generate weighted results that are added together to generate a filtered output signal. Each of the coefficients is multiplied to the input error signal after the input error signal has been delayed by a multiple of a tap delay D. For example, the first coefficient is multiplied to the input signal after a tap delay of D, the second coefficient is multiplied to the input signal after a tap delay of 2D, the third coefficient is multiplied to the input signal after a tap delay of 3D, etc. The coefficients are multiplied to the input signal in the order shown in FIGS. 2A-2B.

The DFIR filter of FIG. 2A applies a total of 43 coefficients to the input error signal from adder 114. The DFIR filter of FIG. 2A initially multiplies a coefficient of −1 to the input signal 20 times during each of 20 different tap delay intervals of the input signal. For example, the DFIR filter multiplies −1 to the input signal after the input signal has been delayed by a tap delay equal to 1D, the DFIR filter multiplies −1 to the input signal after the input signal has been delayed by a tap delay equal to 2D, etc. for a total of 20 multiplications during 20 different tap delay intervals. Subsequently, the DFIR filter of FIG. 2A multiplies a coefficient of F to the input signal after the input signal has been delayed by a tap delay of 21D. Then, the DFIR filter of FIG. 2A multiplies a coefficient of (40-2F) to the input signal after the input signal has been delayed by a tap delay of 22D. Next, the DFIR filter of FIG. 2A multiplies a coefficient of F to the input signal after the input signal has been delayed by a tap delay of 23D.

Lastly, the DFIR filter of FIG. 2A multiplies a coefficient of −1 to the input signal 20 times during each of 20 more tap delay intervals of the input signal. For example, the DFIR filter multiplies −1 to the input signal after the input signal has been delayed by a tap delay equal to 24D, the DFIR filter multiplies −1 to the input signal after the input signal has been delayed by a tap delay equal to 25D, etc. for a total of 20 multiplications during 20 different tap delay intervals. After the DFIR filter multiplies the 43 coefficients to the input signal to generate 43 weighted results, the 43 weighted results are added together to generate a filtered output signal.

The DFIR filter of FIG. 2B applies 23 coefficients to the input error signal from adder 114. The DFIR filter of FIG. 2B initially multiplies a coefficient of −2 to the input signal 10 times during each of 10 different tap delay intervals of the input signal. For example, the DFIR filter multiplies −2 to the input signal after the input signal has been delayed by a tap delay equal to 1D, the DFIR filter multiplies −2 to the input signal after the input signal has been delayed by a tap delay equal to 2D, etc. for a total of 10 multiplications during 10 different tap delay intervals. Subsequently, the DFIR filter of FIG. 2B multiplies a coefficient of F to the input signal after the input signal has been delayed by a delay of 11D. The DFIR filter of FIG. 2B then multiplies a coefficient of (40-2F) to the input signal after the input signal has been delayed by a delay of 12D. The DFIR filter of FIG. 2B then multiplies a coefficient of F to the input signal after the input signal has been delayed by a delay of 13D.

Lastly, the DFIR filter of FIG. 2B again multiplies a coefficient of −2 to the input signal 10 times during each of 10 different tap delay intervals of the input signal. For example, the DFIR filter multiplies −2 to the input signal after the input signal has been delayed by a tap delay equal to 14D, the DFIR filter multiplies −2 to the input signal after the input signal has been delayed by a tap delay equal to 15D, etc. for a total of 10 multiplications during 10 different tap delay intervals. After the DFIR filter multiplies the 23 coefficients to the input signal to generate 23 weighted results, the 23 weighted results are added together to generate a filtered output signal.

The F parameter affects the value of the middle three coefficients of the filters of FIGS. 2A-2B. The F parameter is a positive or negative integer number. The value of the F parameter can, for example, be one of the integer numbers −8, −7, −6, −5, −4, −3, −2, −1, 0, 1, 2, 3, 4, 5, 6, or 7. The F parameter provides flexibility to change the frequency response of the detector. The F parameter is typically changed in response to variations in noise and in the density of the data being read from the magnetic recording medium (e.g., magnetic disk). The density of the data on the magnetic recording medium can vary based on, for example, the bit rate of the bit stream, whether the read sensor is reading data in an inner or outer track of the disk, etc. The F parameter can be different for each individual hard disk drive.

The DFIR filters represented in FIGS. 2A and 2B pass low frequency signals, while at the same time, attenuating very low frequency signals that are near DC. The DFIR filters of FIGS. 2A and 2B introduce a dominant pole into the frequency response that attenuates the very low frequency signals near DC to achieve a DC-free signal response.

Figure 3A:
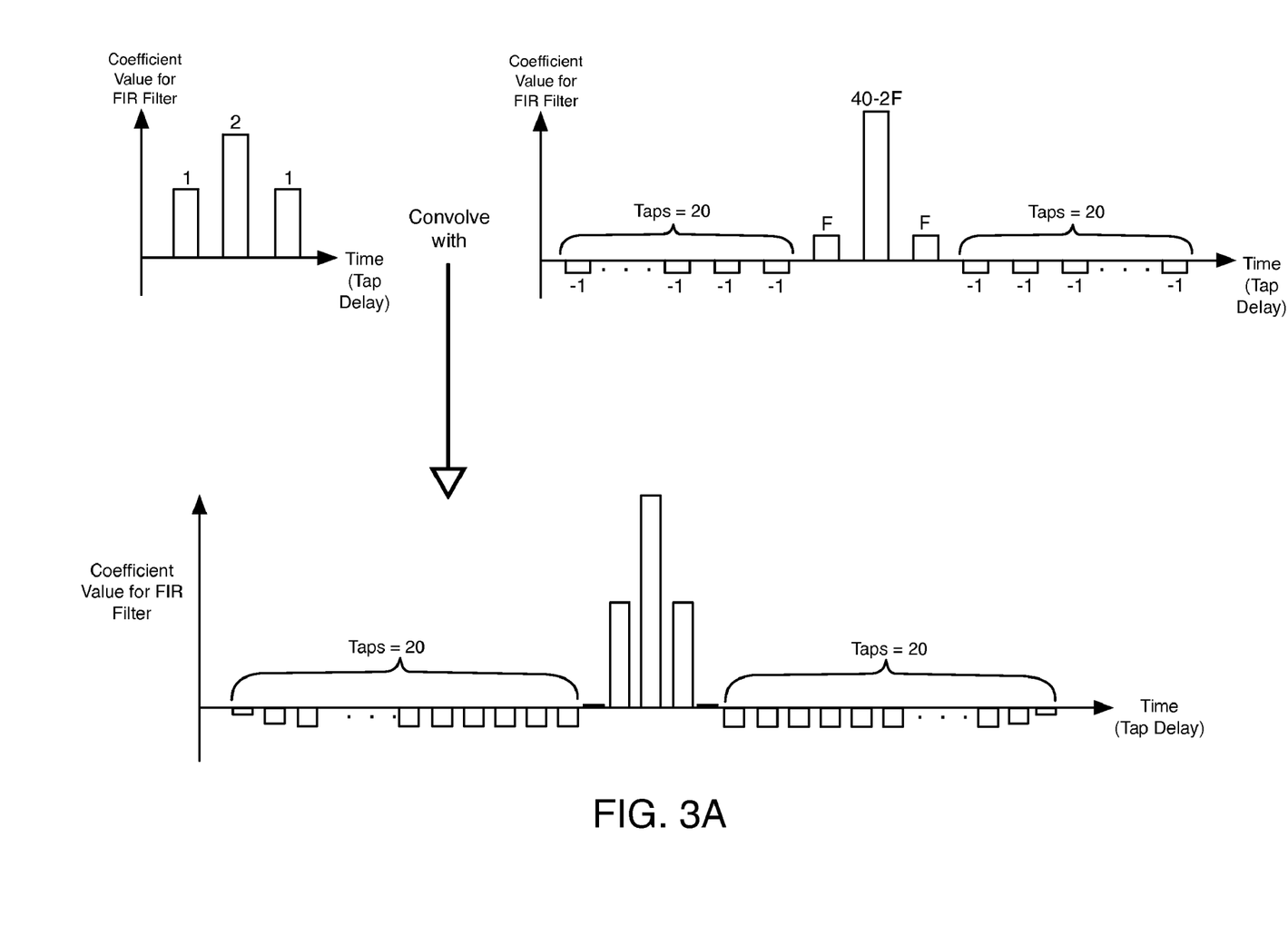
FIG. 3A graphically illustrates the convolution of the responses of the DFIR filter in FIG. 1 and the DC-free SISO matched filter of FIG. 2A, according to an embodiment of the present invention.

FIG. 3A graphically illustrates the convolution of the responses of DFIR filter 108 and the DC-free SISO matched filter 115 of FIG. 2A, according to an embodiment of the present invention. The upper left portion of FIG. 3A shows the equalized response of the system up through the output of DFIR filter 108. The graph in the upper right portion of FIG. 3A shows the tap coefficients of the DFIR filter in DC-free SISO matched filter 115 from FIG. 2A. The bottom of FIG. 3A shows the overall system ISI response at the output of SISO filter 115 after taking the equalized response of '121' and passing it through the additional SISO matched FIR filter 115 having the coefficients shown in FIG. 2A. The equivalent DFIR filter coefficients shown in the bottom of FIG. 3A are generated by convolving a polynomial that represents the response of filter 108 with a polynomial that represents the response of filter 115 having the coefficients shown in FIG. 2A.

Figure 3B:
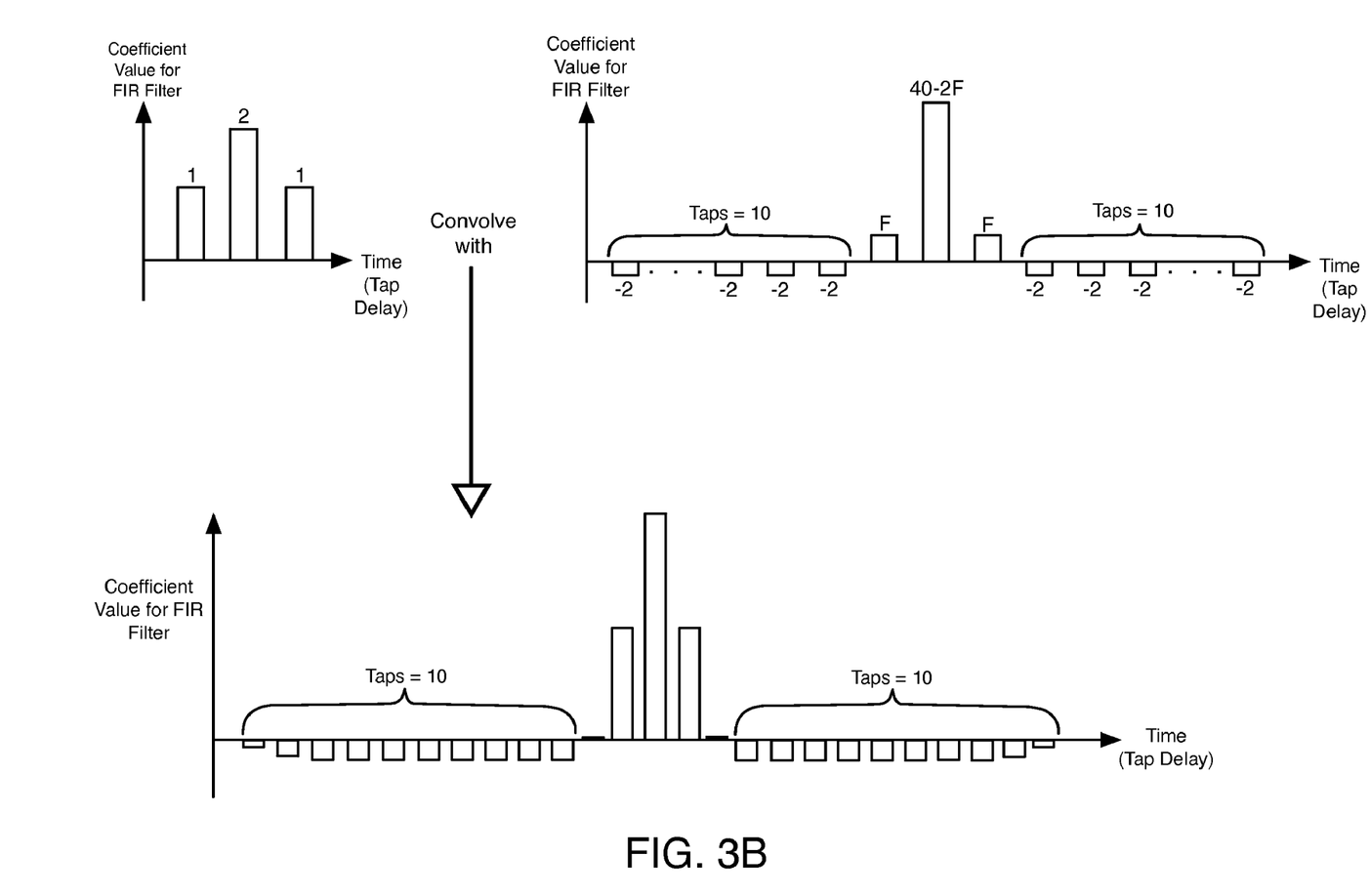
FIG. 3B graphically illustrates the convolution of the responses of the DFIR filter in FIG. 1 and the DC-free SISO matched filter of FIG. 2B, according to an embodiment of the present invention.

FIG. 3B graphically illustrates the convolution of the responses of DFIR filter 108 and the DC-free SISO matched filter 115 of FIG. 2B, according to an embodiment of the present invention. The upper left portion of FIG. 3B shows the equalized response of the system up through the output of the DFIR filter 108. The graph in the upper right portion of FIG. 3B shows the tap coefficients of the DFIR filter in DC-free SISO matched filter 115 from FIG. 2B. The bottom of FIG. 3B shows the overall system ISI response at the output of SISO filter 115 after taking the equalized response of '121' and passing it through the additional SISO matched FIR filter 115 having the coefficients shown in FIG. 2B. The equivalent DFIR filter coefficients shown in the bottom of FIG. 3B are generated by convolving a polynomial that represents the response of filter 108 with a polynomial that represents the response of filter 115 having the coefficients shown in FIG. 2B.

Figure 4:
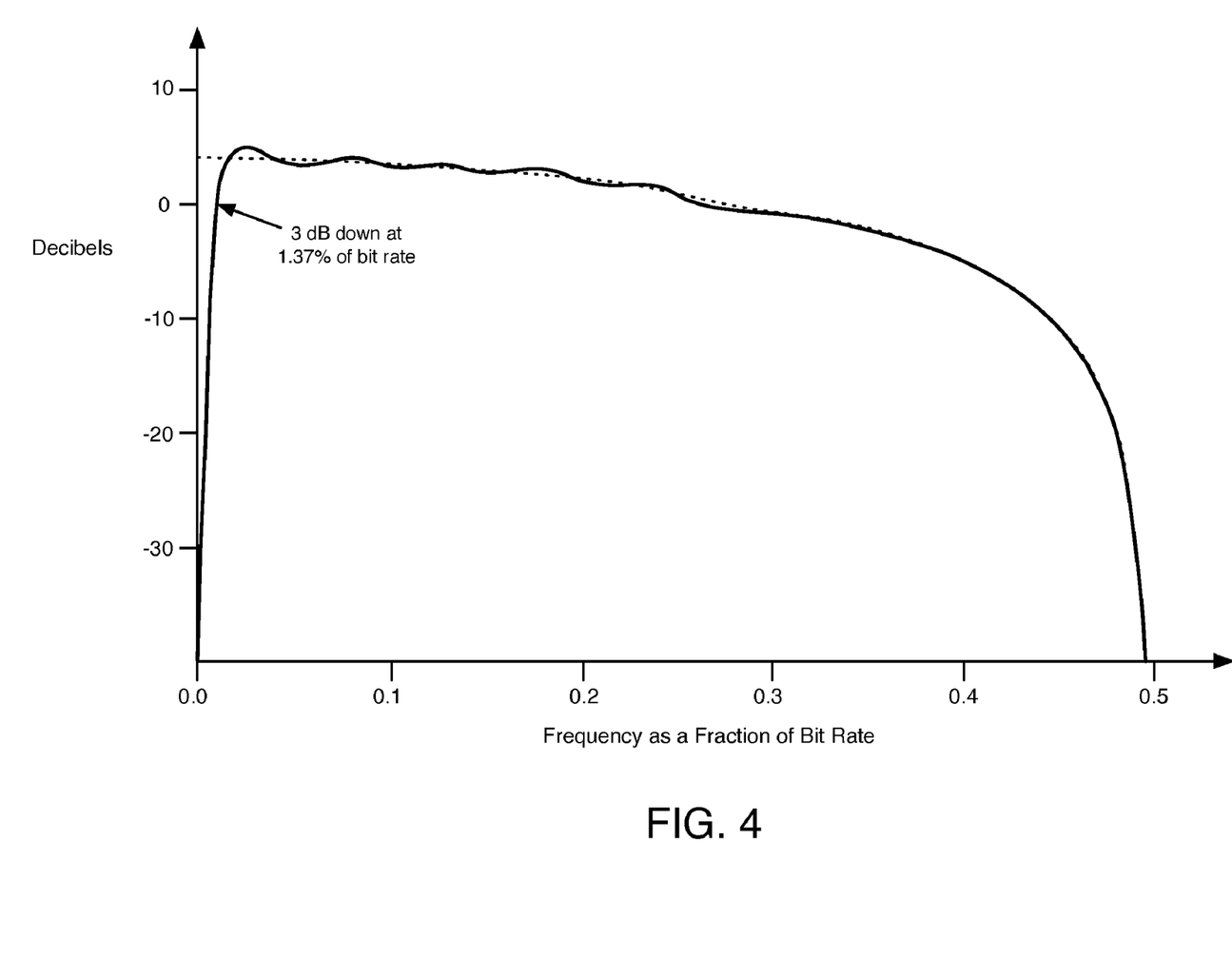
FIG. 4 is a graph that illustrates the frequency response of a system having a DFIR filter with the tap coefficients shown at the bottom of FIG. 3A, according to an embodiment of the present invention.

FIG. 4 is a graph that illustrates the frequency response of a DFIR filter with the tap coefficients shown at the bottom of FIG. 3A, according to an embodiment of the present invention. The vertical axis of FIG. 4 measures the frequency response in decibels, and the horizontal axis of FIG. 4 represents a frequency as a fraction of the bit rate of the read back signal. A range of 0 to 0.5 (50% of the bit rate) is shown in FIG. 4.

The DC 121 target generated by filter 108 is effectively implementing the matched filter metric version of a (1+D) detection target, which is shown by the dotted curve in FIG. 4. As shown in FIG. 4, the '121' target response amplifies low frequency signals all the way to and including DC signals. The solid curve in FIG. 4 represents the frequency response of the tap coefficients shown at the bottom of FIG. 3A. The DFIR filter having the 43 coefficients of FIG. 2A generates a dominant pole. The dominant pole causes the frequency response to have a cutoff frequency at about 1.37% of the bit rate. Above the cutoff frequency, the DFIR filter generates a frequency response that is nearly the same as the DC 121 target. The DFIR filter attenuates frequencies below the cutoff frequency. Thus, the DFIR filter amplifies low frequency signals, but attenuates DC signals that are below 1.37% of the bit rate.

Figure 5:
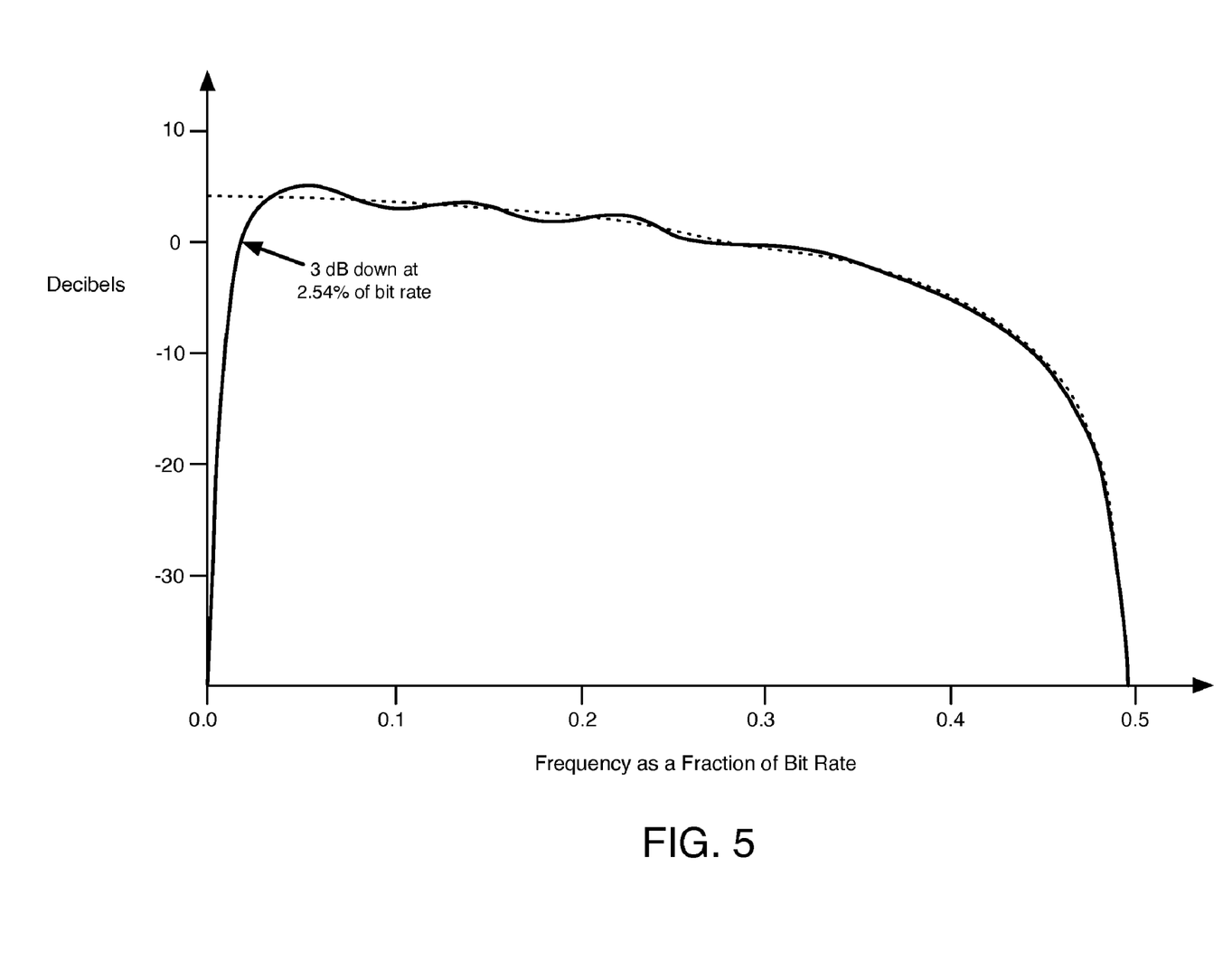
FIG. 5 is a graph that illustrates the frequency response of a system having a DFIR filter with the tap coefficients shown at the bottom of FIG. 3B, according to an embodiment of the present invention.

FIG. 5 is a graph that illustrates the frequency response of a DFIR filter with the tap coefficients shown at the bottom of FIG. 3B, according to an embodiment of the present invention. The vertical axis of FIG. 5 measures the frequency response in decibels, and the horizontal axis of FIG. 5 represents a frequency as a fraction of the bit rate of the read back signal.

The DC 121 target generated by filter 108 is effectively implementing the matched filter metric version of a (1+D) detection target, which is shown by the dotted curve in FIG. 5. The solid curve in FIG. 5 represents the frequency response of the tap coefficients shown at the bottom of FIG. 3B. The DFIR filter having the 23 tap coefficients of FIG. 2B generates a dominant pole. The dominant pole causes the frequency response to have a cutoff frequency at about 2.54% of the bit rate. Above the cutoff frequency, the DFIR filter generates a frequency response that is nearly the same as the DC 121 target. The DFIR filter attenuates frequencies below the cutoff frequency. The DFIR filter of FIGS. 2B and 5 can be used as a backup filter.

The foregoing description of the exemplary embodiments of the present invention has been presented for the purposes of illustration and description. It is not intended to be exhaustive or to limit the present invention to the examples disclosed herein. A latitude of modification, various changes, and substitutions are intended in the present invention. In some instances, features of the present invention can be employed without a corresponding use of other features as set forth. Many modifications and variations are possible in light of the above teachings, without departing from the scope of the present invention. It is not intended that the scope of the present invention be limited with this detailed description.

For example, embodiments of the present invention can be implemented using one or a combination of hardware, software, and a computer-readable medium containing program instructions. Software implemented by embodiments of the present invention and results of the present invention can be stored on a computer-readable medium such as memory, hard disk drive, compact disc (CD), digital video disc (DVD), or other media. Results of the present invention can be used for various purposes such as being executed or processed by a processor, being displayed to a user, transmitted in a signal over a network, etc.

What is claimed is:

1. A data storage device comprising:
   a first filter that generates a short DC equalization target in response to a read back signal generated from magnetic patterns recorded on a storage medium using perpendicular recording;
   a first detector that generates an output sequence in response to the short DC equalization target;
   a high pass filter attenuating DC components of the short DC equalization target and passing low frequency components of the short DC equalization target that are above a cutoff frequency to generate a filtered signal; and
   a second detector that processes the output sequence in response to the filtered signal.

2. The data storage device defined in claim 1 wherein the data storage device is a hard disk drive, and the storage medium is a magnetic hard disk.

3. The data storage device defined in claim 1 wherein the cutoff frequency is between 1 and 2 percent of a bit rate of bits represented by the magnetic patterns.

4. The data storage device defined in claim 1 wherein the cutoff frequency is between 2 and 3 percent of a bit rate of bits represented by the magnetic patterns.

5. The data storage device defined in claim 1 wherein the first filter is a digital finite impulse response filter that generates the short DC equalization target, and the first detector is a Viterbi detector that generates the output sequence in response to the short DC equalization target.

6. The data storage device defined in claim 1 wherein the high pass filter comprises a digital finite impulse response filter having coefficients, and the digital finite impulse response filter multiplies the short DC equalization target by each of the coefficients after the short DC equalization target is delayed by a different tap delay interval.

7. The data storage device defined in claim 6 wherein three of the coefficients of the digital finite impulse response filter are F, 40-2F, and F, wherein F is an integer from −8 to 7.

8. A hard disk drive comprising:
   a first filter that generates a short DC equalization target in response to a read back signal, wherein the read back signal is generated by reading magnetic patterns from a magnetic disk, the magnetic patterns being generated using perpendicular recording;
   a first detector that generates an output sequence in response to the short DC equalization target;
   a soft-input-soft-output high pass filter attenuating DC components of the short DC equalization target and passing low frequency components of the short DC equalization target that are above a cutoff frequency to generate a filtered signal, wherein the low frequency components comprise characteristics of the magnetic patterns; and
   an iterative detector that processes the output sequence in response to the filtered signal.

9. The hard disk drive defined in claim 8 wherein the first detector is a Viterbi detector.

10. The hard disk drive defined in claim 9 wherein the first filter is a digital finite impulse response filter that generates the short DC equalization target in response to the read back signal, and an output signal of the digital finite impulse response filter is transmitted to an input of the Viterbi detector.

11. The hard disk drive defined in claim 8 wherein the soft-input-soft-output high pass filter comprises a digital finite impulse response filter having coefficients that are multiplied by the short DC equalization target after the short DC equalization target has been delayed by tap delay intervals, each of the coefficients being multiplied by the short DC equalization target after one of the tap delay intervals.

12. The hard disk drive defined in claim 11 wherein three of the coefficients of the digital finite impulse response filter are F, 40-2F, and F, wherein F is an integer from −8 to 7.

13. The hard disk drive defined in claim 8 wherein the cutoff frequency is between 1 and 3 percent of a bit rate of bits represented by the magnetic patterns.

14. The hard disk drive defined in claim 8 wherein the cutoff frequency occurs at a greater frequency than any other poles introduced into the read back signal.

15. A method for detecting bits that are stored on a storage device, the method comprising:
   generating a short DC equalization target in response to a read back signal that is generated by reading magnetic patterns from a magnetic medium in the storage device, the magnetic patterns being generated using perpendicular recording;
   detecting a bit sequence in response to the short DC equalization target;
   attenuating DC components of the short DC equalization target and passing low frequency components of the short DC equalization target that are above a cutoff frequency using a high pass filter to generate a filtered signal, wherein the low frequency components comprise characteristics of the magnetic patterns; and
   processing the bit sequence in response to the filtered signal.

16. The method defined in claim 15 wherein the storage device is a hard disk drive, and the magnetic medium is a magnetic hard disk.

17. The method defined in claim 15 wherein detecting the bit sequence in response to the short DC equalization target further comprises detecting the bit sequence using a Viterbi detector; and wherein processing the bit sequence in response to the filtered signal further comprises processing the bit sequence in response to the filtered signal using an iterative detector.

18. The method defined in claim 17 wherein generating the short DC equalization target in response to the read back signal further comprises generating the short DC equalization target using a digital finite impulse response filter, wherein an output signal of the digital finite impulse response filter is transmitted to an input of the Viterbi detector.

19. The method defined in claim 15 wherein the high pass filter is a soft-input-soft-output high pass filer that comprises a digital finite impulse response filter having coefficients that are multiplied by the short DC equalization target after the short DC equalization target has been delayed by tap delay intervals, each of the coefficients being multiplied by the short DC equalization target after one of the tap delay intervals.

20. The method defined in claim 15 wherein the cutoff frequency is between 1 and 3 percent of a bit rate of bits that are represented by the magnetic patterns.

* * * * *